United States Patent
Kanai

[11] Patent Number: 5,850,323
[45] Date of Patent: Dec. 15, 1998

[54] MAGNETORESISTIVE HEAD AND MAGNETIC RECORDING DRIVE

[75] Inventor: Hitoshi Kanai, Kanagawa, Japan

[73] Assignee: Fujitsu Limited, Kawasaki, Japan

[21] Appl. No.: 630,116

[22] Filed: Apr. 8, 1996

[30] Foreign Application Priority Data

Jun. 29, 1995 [JP] Japan .................................. 7-164023

[51] Int. Cl.$^6$ .................................................. G11B 5/39
[52] U.S. Cl. ............................................................ 360/113
[58] Field of Search ........................ 360/113; 338/32 R; 324/252

[56] References Cited

U.S. PATENT DOCUMENTS

| | | | |
|---|---|---|---|
| 4,782,413 | 11/1988 | Howard et al. | 360/113 |
| 4,809,109 | 2/1989 | Howard et al. | 360/113 |
| 5,287,238 | 2/1994 | Baumgart et al. | 360/113 |
| 5,508,866 | 4/1996 | Gill et al. | 360/113 |
| 5,574,605 | 11/1996 | Baumgart et al. | 360/113 |
| 5,637,235 | 6/1997 | Kim et al. | 216/22 |

FOREIGN PATENT DOCUMENTS

| | | |
|---|---|---|
| 676247 | 3/1994 | Japan . |
| 6177453 | 6/1994 | Japan . |
| 6349030 | 12/1994 | Japan . |
| 714125 | 1/1995 | Japan . |

*Primary Examiner*—William J Klimowicz
*Attorney, Agent, or Firm*—Greer, Burns & Crain, Ltd.

[57] ABSTRACT

This invention concerns a magnetoresistive head for converting a change in magnetic field into a change in resistance by virtue of a spin valve magnetoresistive effect. This magneto-resistive transducer has superposed sequentially on a substrate an underlayer formed of two layers consisting of a tantalum film and a nickel iron based alloy film, an antiferromagnetic layer, a first soft magnetic layer, a nonmagnetic metal layer, and a second soft magnetic layer in the order mentioned.

7 Claims, 4 Drawing Sheets

MAGNETORESISTIVE HEAD AND MAGNETIC RECORDING DRIVE

BACKGROUND OF THE INVENTION

1. Field of the Invention

This invention relates to a magnetoresistive head and a magnetic recording drive. More particularly, this invention relates to a magnetoresistive head for converting a change in magnetic field so into a change in resistance by virtue of a spin valve magnetoresistive effect and a magnetic recording drive.

2. Description of the Prior Art

The structure of a magnetoresistive head utilizing the conventional spin valve magnetoresistive effect is shown in FIGS. 1(a) and (b). FIG. 1(a) is a perspective view and FIG. 1(b) is a cross section taken through FIG. 1(a) along a line I—I.

As shown in FIGS. 1(a) and (b), an antiferromagnetic layer 2 made of NiMn, a first soft magnetic layer 3, a nonmagnetic metal layer 4, and a second soft magnetic layer 5 are superposed sequentially in the order mentioned on an alumina-coated AlTic substrate 1 as shown in FIGS. 1(a) and (b). Electrode terminals 6a and 6b are connected severally to the opposite terminal parts of the second soft magnetic layer 5. The area intervening between the electrode terminals 6a and 6b constitutes a sensor area SA which serves the purpose of detecting a change in voltage.

The first soft magnetic layer 3 is exchange coupled with the antiferromagnetic layer 2. In the soft magnetic layer 3, an exchange coupling magnetic field Hua is generated in the direction of the X axis. As a result, the magnetization of the first soft magnetic layer 3 is fixed in the direction of the X axis and precluded from rotating relative to the signal magnetic field in the direction of the X axis.

In contrast, the magnetization of the second soft magnetic layer 5 is set so as to intersect perpendicularly the direction of magnetization of the first soft magnetic layer 3 (i.e. the direction of the Y axis which is the direction of an axis of easy magnetization) when the signal magnetic field is zero. This magnetization, therefore, rotates in conformity with the signal magnetic field. It is for the purpose of varying the magnetic reluctance linearly relative to the magnetic field that the direction of magnetization of the first soft magnetic layer 3 is made to intersect perpendicularly the direction of magnetization of the second soft magnetic layer 5. Then, the resistance of the whole laminated layers vary in direct proportion to the cosine of the angle θ (cos θ) formed by the directions of magnetization of the first soft magnetic layer 3 and the second soft magnetic layer 5. When a flow of current has been already established between the electrode terminals 6a and 6b, this change of resistance is detected as a change of voltage between the electrode terminals 6a and 6b.

As stated in JP-A-06-76,247, however, an antiferromagnetic layer has the antiferromagnetism thereof strongly affected by an underlayer and the exchange coupling magnetic field Hua thereof varied with the material of the underlayer.

In the conventional magnetoresistive head, an NiMn layer does not form a perfect antiferromagnetic layer because the underlayer of this NiMn layer is made of alumina. For this reason, the exchange coupling magnetic field Hua is weak and the magnetization of the first soft magnetic layer is not fixed fully satisfactorily. As a result, it has been difficult to obtain a linear change of magnetic reluctance because the direction of magnetization of the first soft magnetic layer varies relative to the signal magnetic field.

As a measure to avoid this problem of the decline of exchange coupling magnetic field Hua, JP-A-06-76,247 proposes use of a zirconium (Zr) layer as the underlayer. Since Zr is deficient in resistance to corrosion, however, the zirconium layer has the disadvantage that the portion of this zirconium layer which is exposed to the ambient air as when the magneto-resistive transducer is mounted on a magnetic head is corroded by the moisture in the ambient air.

SUMMARY OF THE INVENTION

An object of this invention to provide a magnetoresistive head which uses a material of high resistance to corrosion for an underlayer of an antiferromagnetic layer thereof and also imparts improved crystallinity to the antiferromagnetic layer.

The magnetoresistive head according to this invention uses a two-layer film consisting of a tantalum film (Ta film) and a nickel iron based alloy film (NiFe based alloy film) as the underlayer of the antiferromagnetic layer.

The NiFe based alloy film assumes an FCC (face-centered cubic) crystal structure. The antiferromagnetic layer, particularly that of an NiMn based alloy, which adjoins the NiFe based alloy film, therefore, assumes an FCT (face-centered tetragonal) crystal structure and consequently acquires an improvement in crystallinity. As a result, the exchange coupling magnetic field Hua is so strong and the direction of magnetization of the first soft magnetic layer adjoining the antiferromagnetic layer is fixed so fast in the direction of the exchange coupling magnetic field Hua that a change in magnetic reluctance will be obtained linearly relative to a change in magnetic field. The term "FCT crystal structure" refers to such a structure as is produced when the cube of the FCC crystal structure is transformed into a rectangular solid.

If the NiFe based alloy film were formed directly on an AlTic substrate, the NiFe based alloy film would fail to acquire the FCC crystal structure. In this invention, since the NiFe based alloy film is formed on the Ta film without being brought into direct contact with the AlTic substrate, the Ta film functions to improve the crystallinity of the NiFe based alloy film and allows the NiFe based alloy film to acquire the FCC crystal structure.

The NiFe based alloy film which is used for forming an underlayer may be NiFe alloy film, NiFeCr alloy film, NiFeNb alloy film, or NiFeRh alloy film, whichever best fits the occasion. When the NiFe alloy film which by nature is possessed of an anisotropic magnetoresistive effect among other alloy films cited above is used in its unmodified form as the underlayer, the MR element on the underlayer produces a spin valve effect and the NiFe alloy of the underlayer manifests the anisotropic magnetoresistive effect. The latter effect coupled with the spin valve effect produces a noise. There are times when it proves proper to avoid use of the NiFe alloy film.

In this case, the anisotropic magnetoresistive effect can be decreased and consequently the noise of the magnetic head can be curbed by using one alloy film selected from among the NiFeCr alloy film, NiFeNb alloy film, and NiFeRh alloy film which result from mixing NiFe alloy film respectively with Cr, Nb, and Rh in the place of the NiFe alloy film.

Further, because the underlayer uses the Ta film and the NiFe based alloy film in this invention, it enjoys notably improved resistance to corrosion as compared with that which uses Zr.

Since the magnetic recording drive of this invention uses the magnetoresistive head which is constructed as described above, it manifests high resistance to corrosion, produces a linear change of magnetic reluctance, and emits only indistinct noise.

DESCRIPTION OF THE PREFERRED EMBODIMENT

Figure 1A:
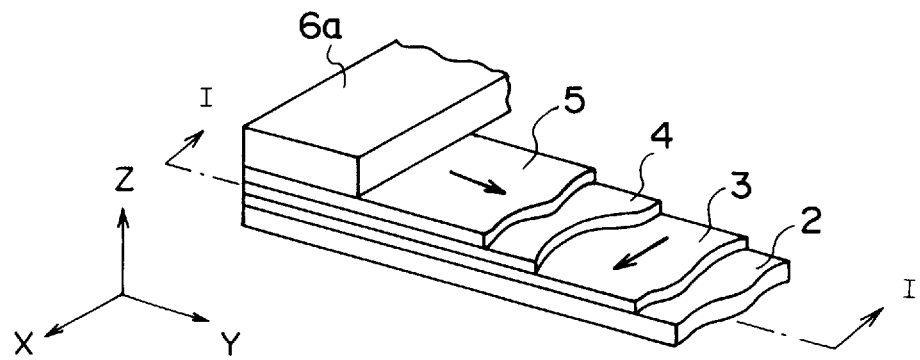
FIG. 1(a) is a perspective view showing a magnetoresistive head according to the prior art and FIG. 1(b) is a cross section taken through FIG. 1(a) along the line I—I.
Figure 1B:
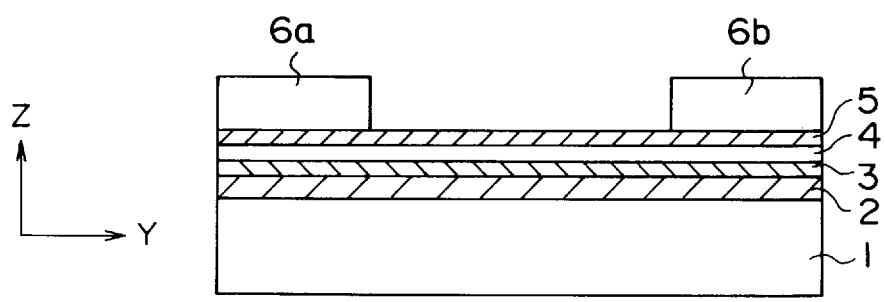
Figure 2A:
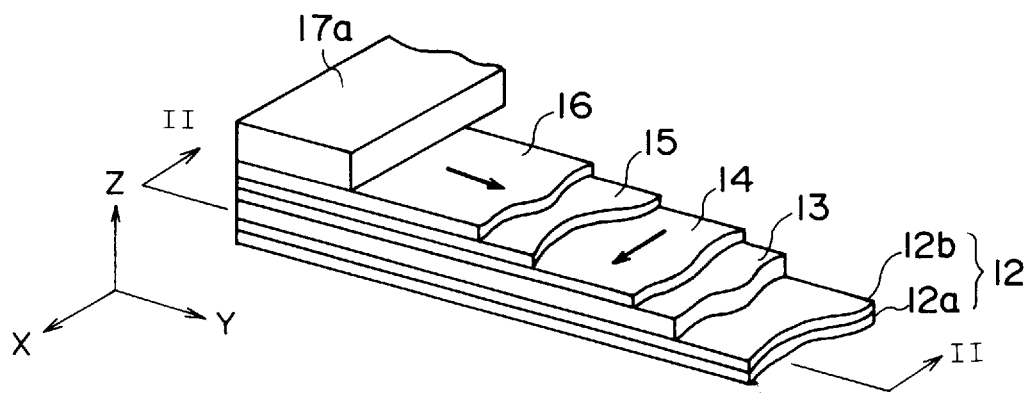
FIG. 2(a) is a perspective view showing a magnetoresistive head according to the first embodiment of this invention and FIG. 2(b) is a cross section taken through FIG. 2(a) along the line II—II.
Figure 2B:
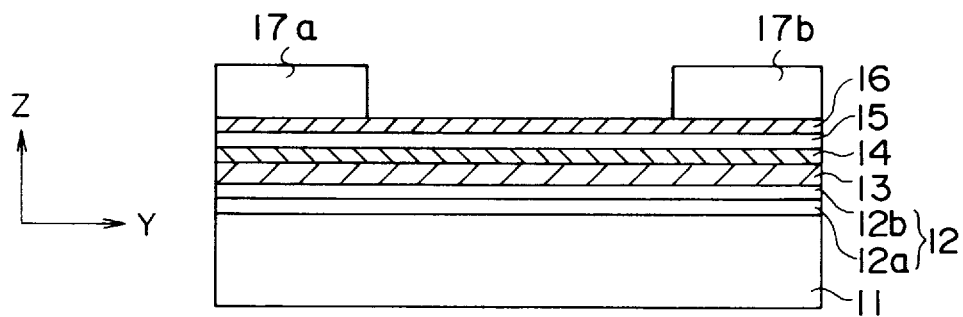

Now, the mode of embodying this invention will be described below with reference to the annexed drawings.
(1) First embodiment A magnetoresistive head according to the first embodiment of this invention will be described with reference to FIGS. 2(a) and (b). FIG. 2(a) is a perspective view and FIG. 2(b) is a cross section taken through FIG. 2(a) along the line II—II. FIG. 2(a) omits showing an AlTic substrate 11.

As shown in FIGS. 2(a) and (b), an underlayer 12 composed of a Ta film 12a having a thickness of 5 to 10 nm and an NiFe film 12b having a thickness of 5 to 20 nm and superposed on the Ta film, an antiferromagnetic layer 13 formed of an NiMn film of a thickness of 20 to 30 nm, a first soft magnetic layer 14 formed of an NiFe film, a Co film, or a Co based alloy film of a thickness of 5 to 10 nm, a nonmagnetic metal layer 15 formed of a Cu film of a thickness of 2 to 3 nm, and a second soft magnetic layer 16 formed of an NiFe film of a thickness of 5 to 10 nm are superposed sequentially in the order mentioned on an AlTic substrate 11 having an alumina film formed on the surface thereof.

Electrode terminals 17a and 17b formed of a metal film of a thickness of 0.3 μm are severally connected to the opposite terminal parts of the second soft magnetic layer 16. An area which intervenes between the electrode terminals 17a and 17b constitutes a sensor area SA for detecting a voltage which varies in response to a signal magnetic field.

In the antiferromagnetic layer 13, an exchange coupling magnetic field Hua is being generated in the direction of the X axis. The first soft magnetic layer 14 is exchange coupled with the antiferromagnetic layer 13. As a result, the magnetization of the first soft magnetic layer 14 is fixed in the direction of the X axis and precluded from rotating relative to the signal magnetic field in the direction of the X axis.

In contrast, the direction of magnetization of the second soft magnetic layer 16 is set so as to intersect perpendicularly the direction of magnetization of the first soft magnetic layer 14 (the direction of the Y axis which is the direction of an axis of easy magnetization) when the signal field is zero.

When a signal magnetic field is applied, the direction of magnetization of the second soft magnetic layer 16 rotates proportionately to the intensity of the signal magnetic field. The resistance of the whole laminated layers vary in direct proportion to the cosine of the angle θ (cos θ) formed by the directions of magnetization of the second soft magnetic layer 16 and the first soft magnetic layer 14. When a flow of current has been already established between the electrode terminals 17a and 17b, this change of resistance is detected as a change of voltage between the electrode terminals 17a and 17b.

Now, the method for the production of the magnetoresistive head described above will be explained below with reference to FIGS. 2(a) and (b).

First, on the alumina film coating the AlTic substrate 11, the underlayer 12 is formed by sequentially superposing thereon the Ta film 12a and the NiFe film 12b by the sputtering technique. If, in this case, the NiFe film 12b were directly formed on either the AlTic substrate 11 or the alumina film, it would not acquire an FCC crystal structure. Since the NiFe film 12b is formed on the Ta film 12a without being brought into direct contact with the AlTic substrate 11 or the alumina film, the Ta film 12a functions to improve the crystallinity of the NiFe film 12b and allows the produced NiFe film 12b to acquire a FCC crystal structure.

Then, the NiMn film 13 is formed on the NiFe film 12b. Thereafter, the superposed layers obtained consequently is heated at a temperature of not less than 250° C. as exposed meanwhile to a magnetic field exerted continuously thereon in a fixed direction at an intensity of not less than 100 oersteds. As a result, the NiMn film 13 is magnetized in the direction of the applied magnetic field and vested with antiferromagnetism. At this time, the NiMn film 13 is enabled by the NiFe film 12b underlying the NiMn film 13 to acquire an FCT crystal structure and constitute a perfect antiferromagnetic layer. As a result, the exchange coupling magnetic field Hua is amply strong and the direction of magnetization of the first soft magnetic layer 14 superposed on the NiMn film 13 is fixed fast in the direction of the exchange coupling magnetic field Hua. This direction is not moved by a magnetic field of the level of intensity of the signal magnetic field.

Then, a magnetic field of an intensity of not less than 100 oersteds is applied to the superposed layers in the same direction as the magnetic field applied during the formation of the NiMn film 13 and the surface of the NiMn film 13 is first sputter etched and the FeNi film 14, the Cu film 15, and the FeNi film 16 are then formed by the sputtering technique sequentially in the order mentioned on the NiMn film 13. The FeNi film 14 is destined to form the first soft magnetic layer, the Cu film 15 the nonmagnetic metal layer, and the FeNi film 16 the second soft magnetic layer respectively. As a result, the first soft magnetic layer 14 and the second soft magnetic layer 16 are magnetized in the same direction as that of the exchange coupling magnetic field Hua. Subsequently, the superposed layers are annealed at a temperature of not less than 200° C. as exposed meanwhile to a magnetic field exerted continuously thereon at an intensity of not less than 100 oersteds in a direction perpendicular to this magnetic field Hua. As a result, the magnetic field assumes a direction perpendicular to the former direction, the magnetization of the first soft magnetic layer 14 is fixed by the exchange coupling to the direction of the magnetic field Hua, and the magnetization of the second soft magnetic field 16 not subject to the influence of the exchange coupling magnetic field Hua is fixed in a direction perpendicular to the direction of the exchange coupling magnetic field Hua.

Then, the underlayer 12, the first soft magnetic layer 14, the nonmagnetic metal layer 14, and the second soft magnetic layer 16 are etched in conformity with an unshown resist mask formed on the second soft magnetic layer 16, each in the shape of an oblong rectangle having a greater dimension in the direction of magnetization of the second soft magnetic layer 16.

Thereafter, an Au film is formed on the second soft magnetic layer 16 and then patterned so as to form the electrode terminals 17a and 17b which contact the opposite terminal parts of the second soft magnetic layer 16.

The magnetoresistive head according to the first embodiment of this invention uses the two-layer film consisting of the Ta film 12a and the NiFe film 12b as the underlayer 12 of the antiferromagnetic layer 13 as described above.

Since the antiferromagnetic layer 13, particularly that of an NiMn based alloy film, has the crystallinity thereof improved by the NiFe based alloy film 12b of excellent crystallinity which contacts the layer 13, the exchange coupling magnetic field Hua is amply strong and the direction of magnetization of the first soft magnetic layer 14 which contacts this layer 13 is fixed fast in the direction of the exchange coupling magnetic field Hua.

Further, since the underlayer 12 uses the Ta film 12a and the NiFe film 12b, it exhibits notably improved resistance to corrosion as compared with the conventional layer of Zr film.

(2) Second embodiment

Figure 3:
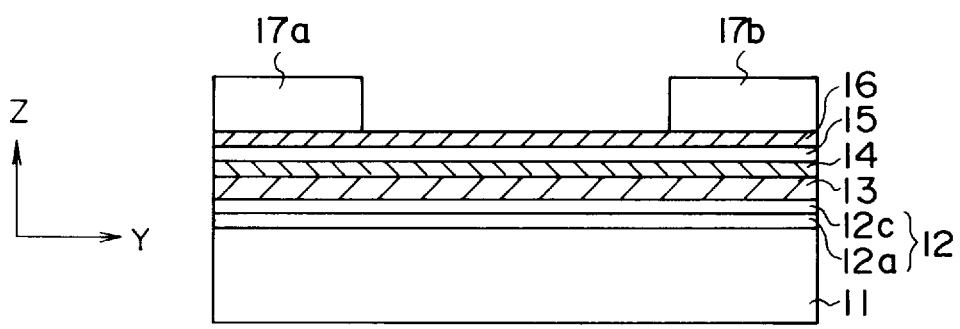
FIG. 3 is a cross section showing a magnetoresistive head according to the second embodiment of this invention.

The magnetoresistive head according to the second embodiment of this invention will be described with reference to FIG. 3. FIG. 3 is a cross section showing the structure of the magnetoresistive head.

The magnetoresistive head of this second embodiment differs from that of the first embodiment in respect that an NiFe based alloy film 12c selected arbitrarily from among NiFeCr alloy film, NiFeNb alloy film, and NiFeRb alloy film is used in the place of the NiFe alloy film 12b of the underlayer 12.

When the NiFe alloy film which by nature is possessed of an anisotropic magnetoresistive effect (AMR effect) is used in its unmodified form as the underlayer 12, the MR element on the underlayer 12 produces a spin valve effect and the NiFe alloy film 12b of the underlayer 12 manifests the anisotropic magnetoresistive effect. The latter effect coupled with the spin valve effect produces a noise.

Since the use of the NiFe based alloy film 12c resulting from mixing NiFe with Cr (chromium), Nb (niobium), or Rh (rhodium) can decrease the anisotropic magnetoresistive effect, it enables the noise of the magnetic head to be abated.

Though the embodiment, as depicted above, uses the NiMn film 13 as an antiferromagnetic layer, it does not preclude the use of an NiMn based alloy film obtained by mixing NiMn with such other element as Cr, Fe, Pt, Nb, or Co.

While the embodiment uses the Ta film 12a and the NiFe based alloy films 12b and 12c as the underlayer 12, it does not discriminate the underlayer 12 on account of the composition of component films thereof. The underlayer 12 may use other composition so long as the composition offers high resistance to corrosion.

(3) Third embodiment

Figure 4A:
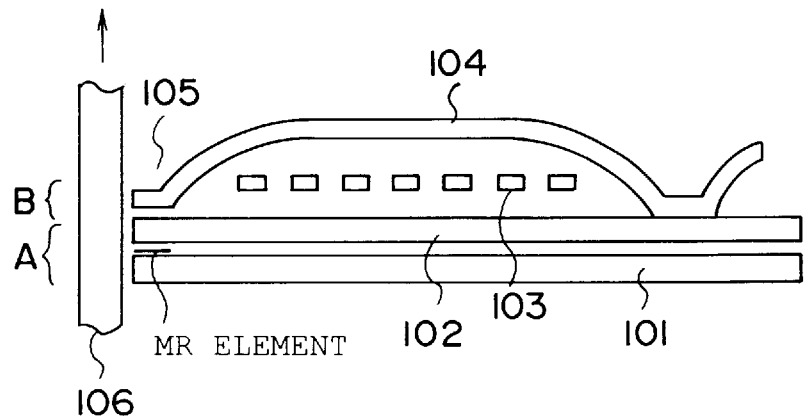
FIG. 4(a) is a cross section showing an in-gap type MR head according to the third embodiment of this invention.
Figure 4B:
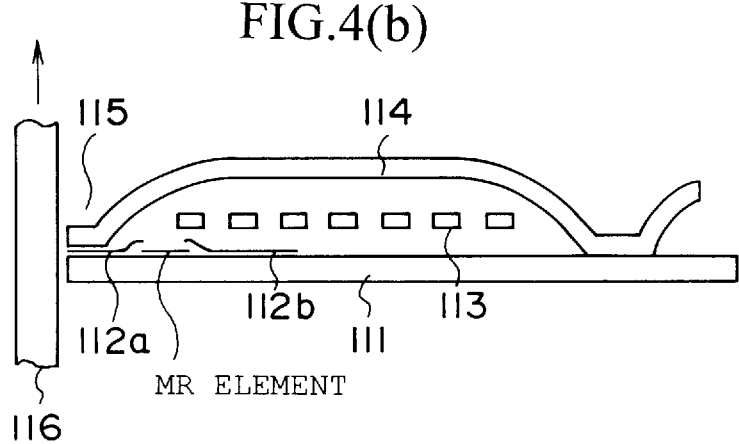
FIG. 4(b) is a cross section showing a common-use type MR head according to the third embodiment of this invention.
Figure 4C:
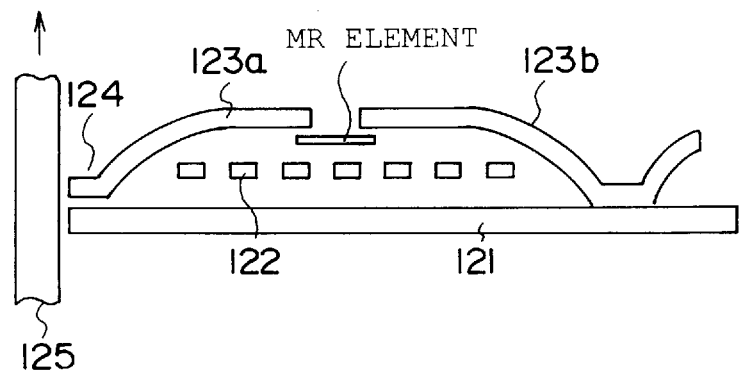
FIG. 4(c) is a cross section showing a yoke type MR head according to the third embodiment of this invention.

Now, a magnetic recording drive according to the third embodiment of this invention using the magnetoresistive head according to the first and the second embodiment described above will be explained below with reference to FIGS. 4(a) through 4(c). FIGS. 4(a) through 4(c) are cross sections showing the magnetic recording medium and the magnetic head as components of the magnetic recording drive.

FIG. 4(a) depicts a composite type MR head. A part represents a reading head and a part B a recording head. A soft magnetic layer 102 concurrently serves as a magnetic shield of the reading head and a magnetic pole of the recording head.

In the part of the reading head, soft magnetic layers 101 and 102 intended as magnetic shields are opposed to each other across an intervening interval and the MR element mentioned above is interposed in a gap between a magnetic recording medium 106 and a part 105 opposed thereto as shown in FIG. 4(a). A leak magnetic field is directly detected by the MR element.

In the part of the recording head, soft magnetic layers 102 and 104 intended as magnetic poles are opposed to each other across an intervening interval and a coil 103 adapted to generate magnetic fluxes flowing through the soft magnetic layers 102 and 104 is formed in the gap between the soft magnetic layers 102 and 104. By the magnetic fluxes, a leak magnetic field is generated through the gap of the opposed part 105 to effect necessary recording in the magnetic recording medium 106.

The AlTic substrate 11 shown in FIG. 2(b) exists between the soft magnetic layer 101 and the MR element.

Since this magnetic recording drive uses the magnetoresistive head according to the embodiment described above, it exhibits high resistance to corrosion, produces a linear change of magnetoresistance, and emits only indistinct noise.

FIG. 4(b) depicts an in-gap type MR head which is possessed of a flux guide. As shown in the diagram, soft magnetic layers 111 and 114 intended as magnetic poles are opposed to each other across an intervening interval, the aforementioned MR element is interposed in a gap between a magnetic recording medium 116 and a part 115 opposed to the medium 116, and a coil 113 adapted to generate magnetic fluxes flowing through the soft magnetic layers 111 and 224 is formed in the gap between the soft magnetic layers 111 and 114.

The MR element is not exposed to the part 115 opposed to the magnetic recording medium 116 but sunken into the magnetic head for the purpose of precluding the MR element from corrosion or preventing the MR element from directly contacting the magnetic recording medium. A flux guide 112a which is electrically insulated from the MR element and magnetically coupled therewith is exposed to the opposed part 115. The leak magnetic field from the magnetic recording medium 116 is injected into the flux guide 112a and detected by the MR element. Another flux guide 112b electrically insulated from the MR element and magnetically coupled therewith is formed at the other terminal of the MR element and adapted to guide the magnetic fluxes flowing through the MR element to the soft magnetic layers 111 and 114.

The AlTic substrate 11 shown in FIG. 2(b) exists between the soft magnetic layer 111 and the MR element.

This magnetic recording drive uses the magnetoresistive head according to the embodiment described above and, therefore, enjoys high resistance to corrosion, produces a linear change of magnetoresistance, and emits only indistinct noise.

FIG. 4(c) represents a yoke type MR head. As shown in this diagram, a soft magnetic layer 121 and soft magnetic layers 123a and 123b intended as magnetic poles are opposed to each other across an intervening interval and a coil 122 adapted to generate magnetic fluxes flowing through the soft magnetic layers 121 and the soft magnetic layers 123a and 123b is formed in the gap between the soft magnetic layers 121 and the soft magnetic layers 123a and 123b. The MR element is disposed as electrically insulated from the soft magnetic layers 123a and 123b and magnetically coupled therewith. Owing to the magnetic fluxes generated at the coil 122 and caused to flow through the soft magnetic layers 121 and 123a and 123b, a leak magnetic field is generated from the gap of the opposed part 124 and recorded in the magnetic recording medium 125.

The AlTic substrate 11 shown in FIG. 2(b) exists between the coil 122 and the MR element.

Since this magnetic recording drive uses the magnetoresistive head according to the embodiment described above, it enjoys high resistance to corrosion, produces a linear change of magnetoresistance, and emits only indistinct noise.

FIGS. 4(a) through 4(c) which show the magnetic recording drive invariably omit illustrating a substrate on which the magnetic head is formed and an insulating film which intervenes between the soft magnetic layers.

The magnetoresistive head according to the present embodiment of this invention need not be used exclusively for the magnetic recording drive described above but may be used for various magnetic recording drives which are possessed of a write part and a read part.

Further, the magnetoresistive head described above can be used for a magnetic recording drive which is exclusively adapted for regeneration.

In the magnetoresistive head according to the present invention, the antiferromagnetic layer is endowed with improved crystallinity because the two layers consisting of the Ta film and the NiFe based alloy film are used as the underlayer of the antiferromagnetic layer. As a result, the exchange coupling magnetic field Hua is so strong and the direction of magnetization of the is fixed soft magnetic layer is fixed so fast in the direction of the exchange coupling magnetic field Hua that a change in magnetic reluctance will be obtained linearly relative to a change in magnetic field.

When an NiFeCr alloy film, an NiFeNb alloy film, or an NiFeRh alloy film, whichever best fits the occasion, is used as the underlayer, it allows further abatement of the noise of the magnetic head because it allows a marked decrease in the anisotropic magnetoresistive effect as compared with the NiFe alloy film.

Further, the use of the Ta film and the NiFe based alloy film as the underground layer contributes to improving this layer in resistance to corrosion.

The magnetic recording drive of this invention uses the magnetoresistive head described above and, therefore, enjoys high resistance to corrosion, produces a linear change of magnetoresistance, and emits only indistinct noise.

What is claimed is:

1. A magnetoresistive head characterized by having superposed sequentially on a substrate:

an underlayer formed of two layers consisting of a tantalum film and a nickel iron based alloy film;

an antiferromagnetic layer wherein said antiferromagnetic layer is a nickel manganese based alloy layer having a face centered tetragonal lattice structure;

a first soft magnetic layer, and a second soft magnetic layer in the order mentioned.

2. The magnetoresistive head according to claim 1, wherein said nickel manganese based alloy layer contains at least one member selected from the group consisting of chromium, iron, platinum, niobium, and cobalt.

3. The magnetoresistive head according to claim 1, wherein said nickel iron based alloy film of said underlayer is a nickel iron based alloy film possessed of a small anisotropic magnetoresistive effect.

4. The magnetoresistive head according to claim 3, wherein said nickel iron based alloy film possessed of a small anisotropic magnetoresistive effect is one member selected from the group consisting of an NiFeCr alloy film, an NiFeNb alloy film, and an NiFeRh alloy film.

5. A magnetic recording drive comprising a magnetoresistive head set forth in claim 1 and a magnetic recording medium.

6. A method for producing a magnetoresistive head, comprising the steps of:

superposing an underlayer formed of two layers consisting of a tantalum film and a nickel iron based alloy film on a substrate;

superposing a nickel manganese based alloy antiferromagnetic layer on said nickel iron based alloy film of said underlayer;

superposing a first soft magnetic layer on said antiferromagnetic layer, superposing a nonmagnetic layer on said first soft magnetic layer;

superposing a second soft magnetic layer on said nonmagnetic layer; and heat treating said superposed layers to impart a face centered tetragonal lattice structure in said antiferromagnetic layer.

7. A magnetoresistive head produced by the method comprising the steps of:

superposing an underlayer formed of two layers consisting of a tantalum film and a nickel iron based alloy film on a substrate;

superposing a nickel manganese based alloy antiferromagnetic layer on said nickel iron based alloy film of said underlayer;

superposing a first soft magnetic layer on said antiferromagnetic layer, superposing a nonmagnetic layer on said first soft magnetic layer;

superposing a second soft magnetic layer on said nonmagnetic layer; and heat treating said superposed layers to impart a face centered tetragonal lattice structure in said antiferromagnetic layer.

* * * * *

UNITED STATES PATENT AND TRADEMARK OFFICE
CERTIFICATE OF CORRECTION

PATENT NO. : 5,850,323
DATED : December 15, 1998
INVENTOR(S) : Hitoshi Kanai

Page 1 of 3

It is certified that error appears in the above-identified patent and that said Letters Patent is hereby corrected as shown below:

Column 1, line 9, delete "so"

Column 1, line 23, delete "AlTic" and insert --AlTiC-- therefor

Column 1, line 44, before "that" insert --so--

Column 1, line 46, begin new paragraph after "5"

Column 2, line 37, delete "AlTic" and insert --AlTiC-- therefor

Column 2, line 40, delete "AlTic" and insert --AlTiC-- therefor

UNITED STATES PATENT AND TRADEMARK OFFICE
CERTIFICATE OF CORRECTION

PATENT NO. : 5,850,323
DATED : December 15, 1998
INVENTOR(S) : Hitoshi Kanai

It is certified that error appears in the above-identified patent and that said Letters Patent is hereby corrected as shown below:

Column 3, line 32, delete "AlTic" and insert

--AlTiC-- therefor

Column 3, line 43, delete "AlTic" and insert

--AlTiC-- therefor

Column 4, line 11, delete "AlTic" and insert

--AlTiC-- therefor

Column 4, line 15, delete "AlTic" and insert

--AlTiC-- therefor

Column 4, line 18, delete "AlTic" and insert

--AlTiC-- therefor

UNITED STATES PATENT AND TRADEMARK OFFICE
CERTIFICATE OF CORRECTION

PATENT NO. : 5,850,323
DATED : December 15, 1998
INVENTOR(S) : Hitoshi Kanai

It is certified that error appears in the above-identified patent and that said Letters Patent is hereby corrected as shown below:

Column 6, line 20, delete "AlTic" and insert

--AlTiC-- therefor

Column 6, line 52, delete "AlTic" and insert

--AltiC-- therefor

Column 7, line 7, delete "AlTic" and insert

--AlTiC-- therefor

Signed and Sealed this

Thirtieth Day of November, 1999

Attest:

Attesting Officer

Q. TODD DICKINSON

Acting Commissioner of Patents and Trademarks